United States Patent [19]
Jones

[11] 3,801,441
[45] Apr. 2, 1974

[54] FAILED NUCLEAR REACTOR FUEL DETECTION APPARATUS

[75] Inventor: Cecil R. Jones, Hamden, Conn.

[73] Assignee: Transfer Systems Incorporated, New Haven, Conn.

[22] Filed: Oct. 12, 1971

[21] Appl. No.: 188,151

[52] U.S. Cl.............................................. 176/19 R
[51] Int. Cl.............................................. G21c 7/00
[58] Field of Search....................... 176/19 R, 19 LD

[56] References Cited
UNITED STATES PATENTS

| | | | |
|---|---|---|---|
| 3,219,536 | 11/1965 | Butler et al..................... | 176/19 LD |
| 3,234,101 | 2/1966 | Berthod.......................... | 176/19 LD |
| 3,393,125 | 7/1968 | Jackson........................... | 176/19 R |
| 3,575,802 | 4/1971 | Gelius............................. | 176/19 R |

Primary Examiner—Reuben Epstein

[57] ABSTRACT

Apparatus for detecting failed or leaking fuel rods in fuel assemblies in a nuclear reactor for power generation are described. A gripper for the fuel assembly is combined with a sampling tube for sucking up a coolant sample after the temperature of the fuel rods has been increased to a level causing increased emission of radioactive residues from a leaking rod. For the BWR, the gripper couples to the fuel assembly channel while in the reactor core in such manner as to isolate in a substantially air-tight manner the fuel assembly. Then an air bubble is introduced depressing the coolant level causing the desired temperature increase. For the PWR, the gripper lifts the fuel assembly into an overhead container to isolate same, and then heat is supplied via auxiliary heaters to raise the temperature of the fuel rods. To increase the sensitivity, the coolant sample is taken from below the upper fuel rod support.

5 Claims, 7 Drawing Figures

INVENTOR.
CECIL R. JONES

*INVENTOR.*
CECIL R. JONES

BY

ATTORNEY

FAILED NUCLEAR REACTOR FUEL DETECTION APPARATUS

This invention relates to apparatus and method for detecting failed fuel rods in fuel assemblies used in power generating nuclear reactors.

BACKGROUND OF INVENTION

There are several methods employed in the art for detecting failed fuel elements. The method commonly employed in a pressurized water reactor (PWR) is to lift out of the reactor core the fuel assembly to be tested, move it out of the reactor well into an adjacent pool, place it into a container in the adjacent pool, close the container, and after waiting thirty minutes or more, take a water sample from the container and test for the presence of certain radioactive isotopes emitted by leaking fuel rods. This method is very time consuming and cumbersome. The total time required for the entire process can be several hours for each fuel assembly.

The method commonly employed for a boiling water reactor (BWR) involves locating an apparatus over the fuel assembly while in the reactor core, and then causing the apparatus to seal to the upper core grid plate by a metal to metal contact, after which an air bubble is introduced to depress the coolant level causing increased heating of the fuel rods, and then a water sample is taken at a location just above the fuel rods. The problems involved here are that the pressure caused by the air bubble may cause lifting of the apparatus breaking the seal to the grid. Another disadvantage is that the water sample taken from above the fuel rods may not contain a sufficiently high concentration of the isotope residues affording a satisfactory indication of the presence of a leaking fuel rod. Also, certain short-lived isotopes especially characteristic of leaking fuel rods may no longer be present because of radioactive decay by the time they diffuse from the leak to above the fuel rods where the sample is taken.

In my copending application, Ser. No. 178,175, filed Sept. 7, 1971, I describe and illustrate a novel gripper apparatus for gripping and lifting a fuel assembly for a BWR or PWR. My novel gripper comprises a gripper tube supported by an overhead hoist and terminating at its bottom in a square opening with beveled edges. The beveled edges are adapted to mate with corresponding beveled edges at the top of the channel of a novel BWR fuel assembly also described in said copending application Ser. No. 178,175. Mounted on the inside of the gripper tube on horizontal square guide pins for lateral sliding movement relative thereto are a plurality of depending gripper fingers terminating in lateral projections for engaging recesses in the fuel assembly channel or housing for lifting same. The gripper fingers are moved outwardly into engagement with, or inwardly out of engagement with, the fuel assembly by a rotatable actuator mechanism located within the gripper tube and comprising a central square tube having at its bottom horizontal cam segments containing adjacent its peripheral edge upstanding cam pins adapted to engage an overlying cam follower secured to the gripper fingers. Means comprising an air cylinder driven actuator tube are provided to rotate the square tube causing rotation of the cam pins causing the follower and attached fingers to be moved laterally along their supporting guide pins outwardly or inwardly depending upon the direction of rotation. My novel gripper also provides a spring biased lock to prevent disengagement of the gripper fingers while a load is applied, and also permits complete disassembly of the apparatus from above in case of malfunction.

In my copending application, Ser. No. 156,446, filed June 24, 1971, I describe and illustrate apparatus for testing conventional BWR fuel assemblies for leaking fuel rods. The apparatus comprises a structure adapted to be brought down over the reactor core into gasket sealing relation with the upper core plate over one or more fuel assemblies to isolate them in a substantially air tight manner from the remaining fuel assemblies. A conventional internal grapple then is secured to the fuel assembly handle. Means are provided to pump air into the isolated assemblies forcing out the coolant water normally present until the water level is depressed to the level of the core plate within the isolated fuel assemblies. Due to the reduced cooling, the isolated fuel assemblies soon overheat, causing any leaking fuel rods present to emit into the water remaining a higher concentration of characteristic radioactive material. Samples of the water remaining are then taken via a sampling tube, a process called sipping, and the samples analyzed for the presence of certain isotopes characteristic of leaking fuel rods. In this sipping process, the water samples are taken at or below the level of the core grid.

The sipping arrangement described in copending application Ser. No. 156,446 may have certain disadvantages which limit its potential use. One possible disadvantage is that effecting a tight seal to the core grid to isolate the fuel assemblies is sometimes difficult if the grid and sampling apparatus are not precisely oriented with respect to each other. Another disadvantage is that the apparatus described is not suitable for the novel fuel assembly described in my copending application, Ser. No. 178,175 which lacks a handle.

The sipping process described above also is not applicable to a PWR because coolant circulates freely between all the fuel assemblies and is not channelized as in the BWR fuel assembly.

The present invention has as its main object the provision of apparatus for isolating directly the fuel assembly of a BWR or PWR and also providing for obtainment of a coolant sample well below the top of the fuel rod assembly or bundle to afford a more accurate test for the presence of a leaking fuel rod.

SUMMARY OF THE INVENTION

The invention takes different forms when applied to a BWR or PWR. For the BWR, the invention is based upon the recognition that my novel fuel assembly described in copending application Ser. No. 178,175 lends itself quite readily to a sipping process using a modified gripper apparatus of the type depicted in said copending application Ser. No. 178,175. In this embodiment, the substantially air-tight seal to isolate the fuel assembly is effected via the mating bevelled edges of the fuel assembly channel top and the gripper tube bottom. The sampling tube is mounted in the modified gripper in a position to register with an unoccupied opening in the upper tie plate for the assembled fuel rods, and thus can be extended down below the upper tie plate in a position to obtain a coolant sample with a higher concentration of radioactive residues, especially short-lived isotopes, from a leaking fuel rod if present.

For application to the PWR, the invention provides a gripper located over the reactor core for lifting up a fuel assembly into an overlying container which can be substantially closed off after receiving the fuel assembly to isolate it and a given quantity of coolant. Means are provided within the isolation tube to heat the enclosed fuel assembly causing the emission of radioactive residues from a leaking fuel rod into the isolated coolant, and the coolant sipped via a sampling tube introduced below the fuel assembly top nozzle to test for the presence of such residues.

The invention will now be described in greater detail with reference to the accompanying drawings wherein:

FIG. 1 is a partially cross-sectional, partially elevational and schematic view of one form of my testing apparatus for use with a BWR. The solid line construction is for use with a single fuel assembly. The phantom view alongside shows how the single unit is readily multiplied for use with multiple fuel assemblies;

FIG. 2 is a partly cross-sectional, partly elevational view of one form of my testing apparatus for use with a PWR;

FIGS. 3 and 4 are cross-sectional views, and FIG. 5 is a bottom view of the apparatus of FIG. 2 taken along the lines 3—3, 4—4, and 5—5 respectively;

BWR EMBODIMENT

Reference is had to my copending application, Ser. No. 178,175 for a detailed description of the novel gripper apparatus and BWR fuel assembly described and claimed therein. Repeating this detailed description is unnecessary, and thus the present specification will concentrate on the parts of the gripper apparatus that have been modified to achieve the present objects.

Figure 1:
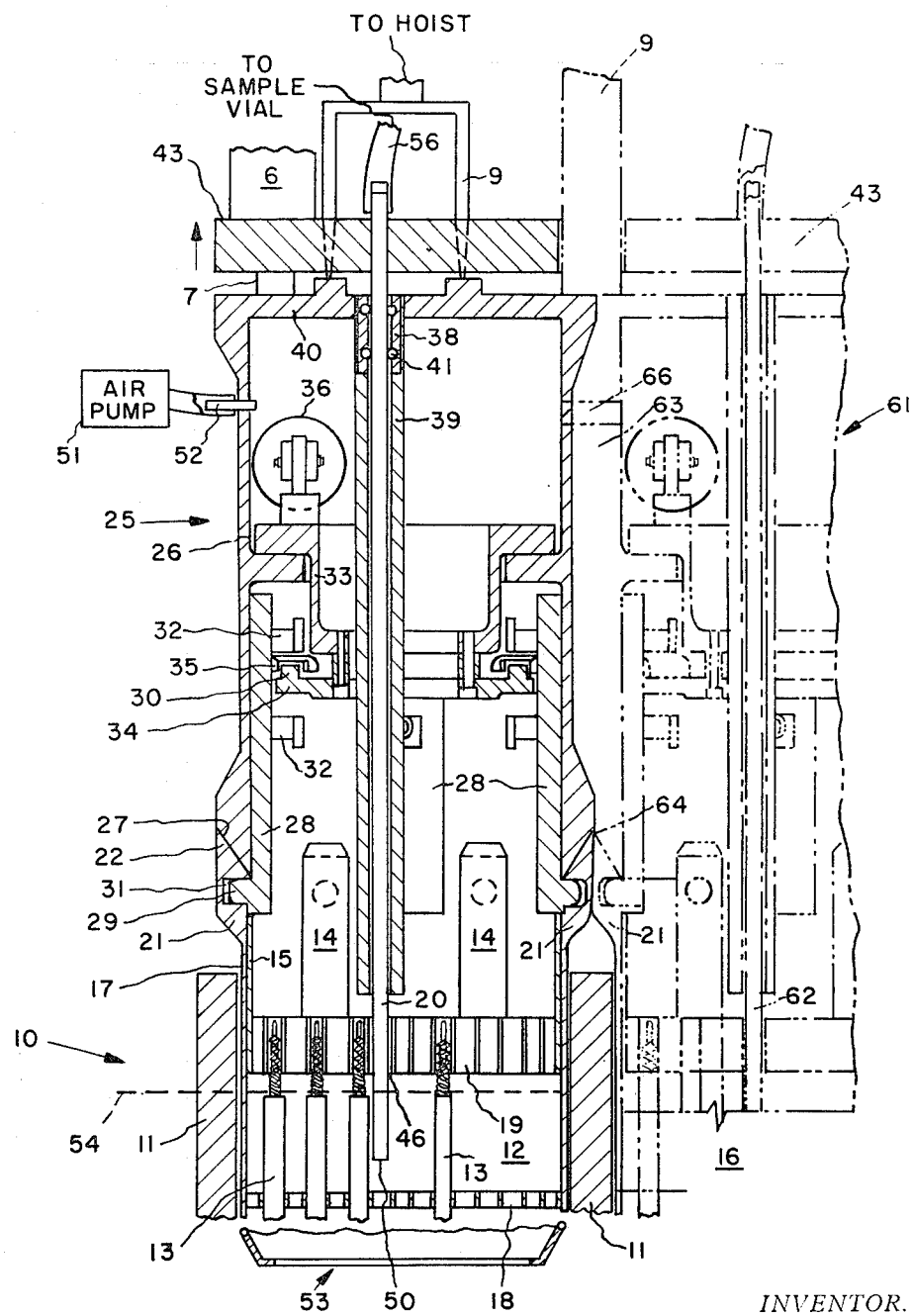

FIG. 1 illustrates part of a reactor core 10 of a conventional BWR with an upper core grid plate 11 supporting in parallel position a plurality of fuel assemblies 12 of the type depicted in my copending application, Ser. No. 178,175. These fuel assemblies differ from the prior art versions mainly in the use of identical fuel rods 13 and thus capable of occupying any position within the fuel assembly, and the provision of a spring 14 mounted, removable upper tie plate 15 for fixing the positions of the parallel fuel rods. The spaced fuel rods, only some of which are shown, are held within the channel or housing 17 by the upper 15 and lower (not shown) tie plates and intermediate spacers 18, only one of which is shown. As will be noted, the upper tie plate 15 is apertured 19 to permit the free flow of coolant therethrough. Many of the apertures are unoccupied, and my invention will provide for passage of a sampling tube shown at 20 through one of the unoccupied apertures into the space between the upper tie plate 15 and the adjacent spacer 18.

The top end of the channel or housing forms a square opening surrounded by walls 21 terminating in bevelled edges 22, which are employed as part of the sealing system to isolate the fuel assembly.

The modified gripper apparatus 25 is brought down via a coupling 9 by a suitable hoist not shown over the reactor well. It comprises, similarly to what is described in my copending application, Ser. No. 178,175 a gripper tube 26 terminating at its bottom in a square opening defined by beveled edges 27 dimensioned to fit within and mate with the beveled edges 22 of the channel 21 forming a substantially water-tight and air-tight seal. The gripper tube 26 is tightly held to the channel by four gripper fingers 28, terminating in lateral projections 29 engaging holes 31 in the channel wall 21. In my copending application, such a coupling is used to lift the fuel assembly when the gripper is lifted. In the present invention, the coupling is employed to prevent lifting of the gripper due to air pressure when air is pumped into the sealed compartment 25 to reduce the water level.

Figure 7:
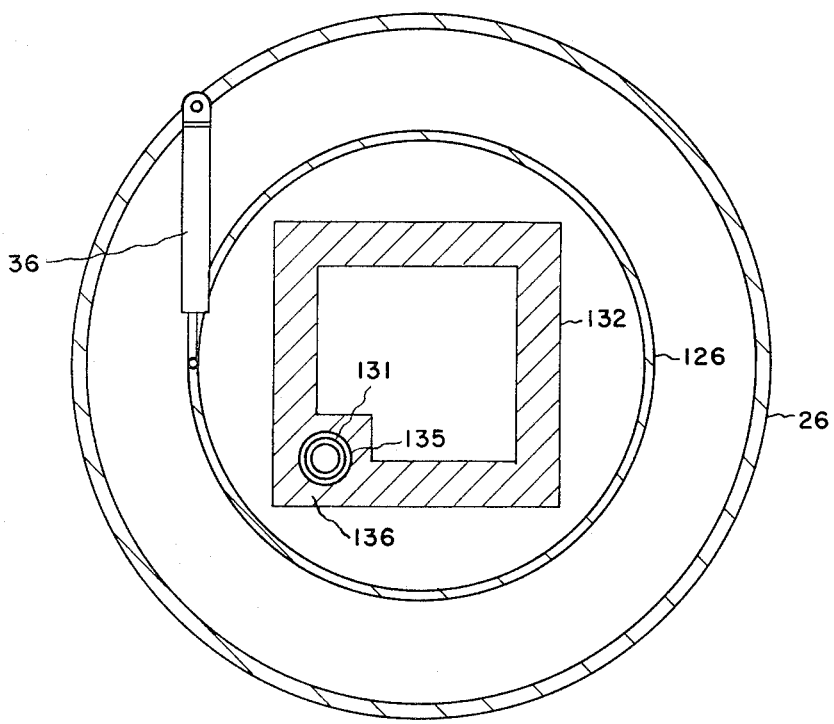
FIG. 7 is a cross-sectional view of the gripper of FIG. 6 taken along the line 7—7.

The gripper fingers 28 are supported by square guide pins 32 mounted on the gripper tube 26, and which allow the gripper fingers to move laterally inwardly to release the fuel assembly, or outwardly to grip the assembly. Such lateral movement is accomplished in the same manner as depicted in my copending application, Ser. No. 178,175 via a square tube 33 secured at its bottom to horizontal cam segments 34 and cam pins 30 equal in number to the number of gripper fingers. Each gripper finger is provided with a suitable cam follower 35. Rotation of the cam segments 34 out of the drawing plane causes rotation of the cam pins pushing the cam follower 35 and attached finger 28 outwardly. Reversing the rotation reverses the movement. The rotation is imparted by a suitable hydraulic cylinder 36 coupled to the upper end of the square tube 33. (FIG. 7 depicts a comparable arrangement for the PWR gripper via an intervening activator tube.) The fixed remote end of the cylinder is coupled to the outer gripper tube 26.

My copending application, Ser. No. 178,175 also provides a spring biased locking system to prevent disengagement of the gripper fingers while they are supporting the fuel assembly load, but since the fuel assembly is not lifted out of the core in the present invention, such a safety feature is unnecessary and has been omitted.

The gripper 26 is also provided with means for accommodating in a substantially air-tight manner a movable sampling tube 20. The sampling tube 20 engages a sleeve 38 secured in a sampling guide tube 39 depending from an upper support plate 40 from which the gripper tube is also suspended. The sleeve 38 is provided with inset O-rings 41 enabling substantial sealing to the sampling tube awhile permitting vertical movement of the sampling tube through the guide 39.

The sampling tube 20 itself is supported by an overhead plate 43 aligned relative to the gripper upper plate 40 via the piston 7 of an air cylinder 6 providing for limited vertical movement of the plate 43 relative to the gripper plate 40.

In operation, after shutting down of the reactor and opening of the reactor well exposing the core and fuel assemblies, the gripper tube 26 is oriented over the fuel assembly to be tested and then slowly lowered into position until the gripper flanges 27 seat within the channel flanges 22. During this initial phase, the sampling tube 20 support plate 43 is in a raised position relative to the plate 40 preventing possible contact of the sampling tube end 50 with the upper tie plate 15. Then the gripper air cylinder 36 is activated rotating the square tube 33 and causing the gripper fingers 28 to engage the channel recesses 31 locking the gripper to the selected fuel assembly as shown. The sampling guide tube 39 is now aligned over an unoccupied hole 46 in the upper tie plate 15.

Next, the sampling tube support structure 43 is slowly lowered by air cylinder 6 to the position shown in the drawing lowering the sampling tube 20 through the guide tube 39 until its open end 50 passes through the upper tie plate aperture 46 but before the next lowest spacer 18 is reached. Then a suitable air pump 51 connected to inlet 52 is actuated pumping air into the water filled enclosed space which displaces the water. The only exit available for the displaced water is the open bottom 53 of the fuel assembly channel. Thus, as air is continually pumped in, the water level within the gripper-channel compartment falls. The water level is stabilized at just above the sampling tube opening, as shown by the dashed line 54. The reduced cooling effected by the reduced water level causes in a short time of, say, 15–30 minutes a substantial rise in the temperature of the fuel rods 13 in the selected fuel assembly. As the temperature climbs to about 150° F or higher, radioactive isotopes emitted into the remaining water by a leaking fuel rod intensifies, increasing considerably the concentration therein. After the aforementioned delay time, a sample of the water still left in the fuel assembly is sucked up through the sampling tube 20 and carried by a flexible tube 56 into a suitable vial (not shown), and, as explained in my copending application, Ser. No. 156,446, subjected to a suitable analysis to determine the presence therein of certain isotopes characteristic of a leaking fuel rod. If the analysis indicates leakage is present, the fuel assembly is designated for later replacement.

As mentioned earlier, improved sensitivity is obtained because the water sample is taken from well below the upper tie plate of the fuel assembly, and thus will contain a higher concentration of especially short-lived isotopes such as Iodine 131, typically generated by leaking fuel rods, than in the case of a sample taken from the level of the top of the core grid.

After the sampling process is completed, the sampling tube 20 is withdrawn by raising its support 43, the air cylinder 36 for actuating the gripper mechanism reversed, and upon release of the gripper fingers, the gripper apparatus can be lifted by the hoist and moved over another fuel assembly to be tested. For removal of a defective fuel assembly, the gripper of my copending application, Ser. No. 178,175, is employed.

The gripper-sipper apparatus of my invention is adapted to engage and sip from a single BWR fuel assembly, as illustrated in solid lines in FIG. 1, or from multiple fuel assemblies, preferably four at a time or multiples of four. This is obtained by multiplying the structure depicted in FIG. 1 so as to encompass several adjacent fuel assemblies. This is illustrated in phantom in FIG. 1, which shows a second fuel assembly 16 being simultaneously gripped by a second gripper apparatus 61 also provided with its own sampling tube 62. Where several grippers are provided, they can be united into a single mechanism. This is simply accomplished by joining the adjacent gripper tube walls 26 to form a common wall 63 terminating in a V-shaped slot 64 for simultaneously sealing to adjacent channel walls 21 of adjacent fuel assemblies. Similarly, the sampling tube supports 43 can be combined into a single structure movable simultaneously. An air vent 66 provided in the common gripper wall 63 serves to combine the separate spaces into a single combined isolated space comprising plural fuel assemblies, thus allowing the use of a single air pump.

The aforedescribed BWR embodiment provides for isolation of individual or plural adjacent fuel assemblies while still retained within the reactor core. This is possible because each fuel assembly is isolated, insofar as the coolant is concerned, from its neighbor except by its channel opening 53 at the bottom. Thus, the above embodiment is not suitable for a PWR, where coolant circulates freely between the fuel rod clusters or fuel rod assemblies. To isolate the latter for sipping purposes requires a modified system.

PWR EMBODIMENT

In this embodiment of my invention, the fuel assembly is isolated by relocating it while still in the reactor well and under water in an overhead isolation container.

Figure 2:
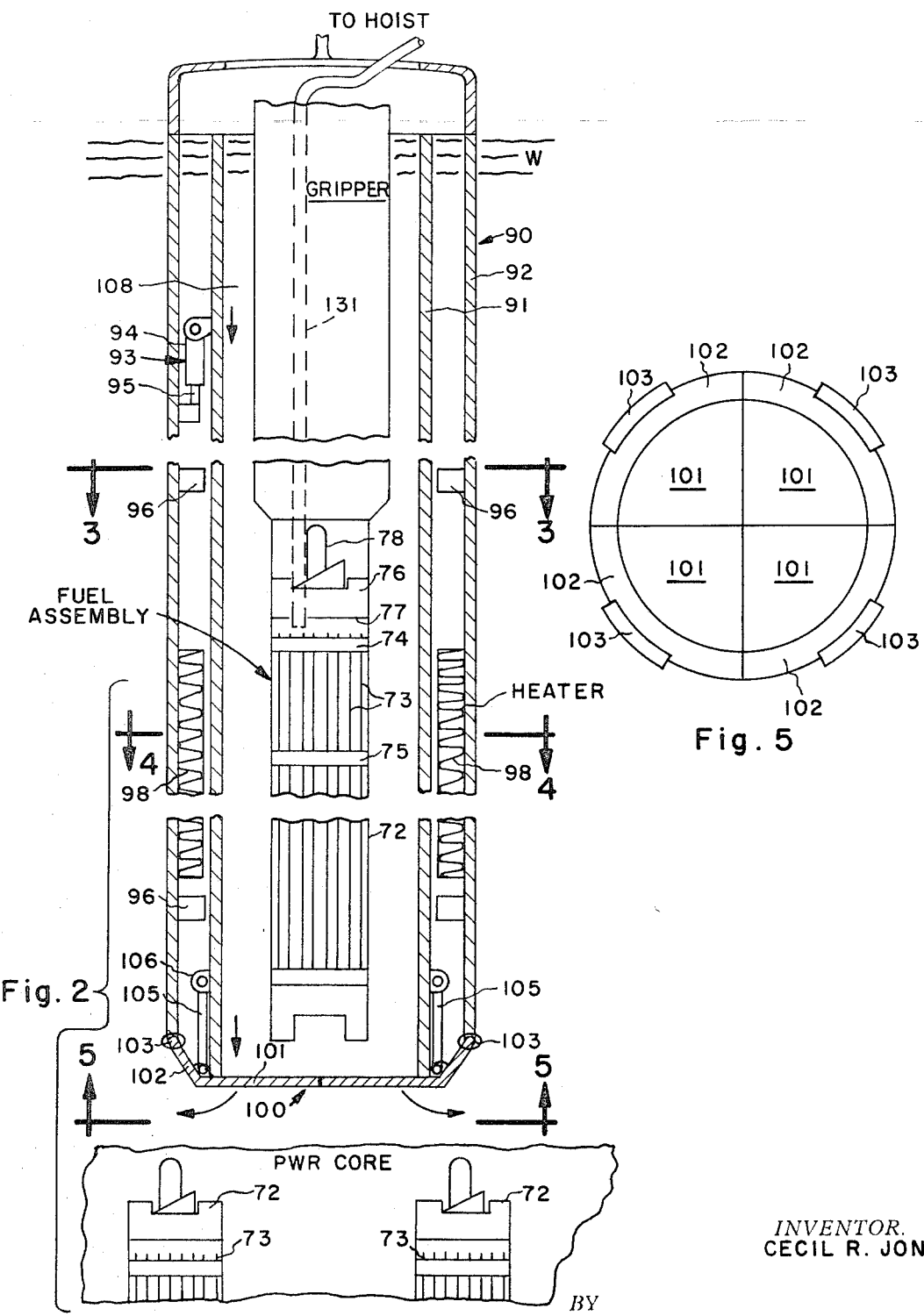
Figure 3:
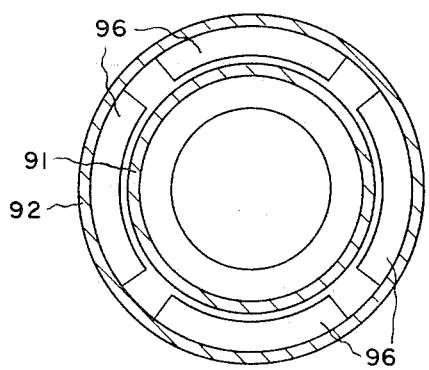
Figure 4:
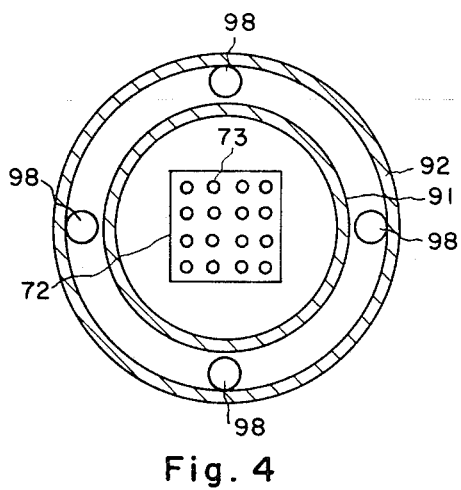

This is depicted in FIG. 2. Part of the reactor core is shown at 70, and comprises a plurality of adjacent fuel assemblies 72 of conventional construction comprising a plurality of parallel spaced fuel rods 73 held in position at their upper ends by an upper grid assembly 74 and below by intermediate grid assembly 75. Located over the assembled fuel rods is a top nozzle 76 having an apertured grid bottom 77 for aligning control rods of a control rod assembly 78. A triangular element is positioned on top.

As described in my copending application Ser. No. 178,175, such a fuel assembly can be gripped and lifted by the same gripper apparatus described therein for the BWR slightly modified insofar as the ends of the gripper fingers are concerned to enable them to be extended inside and under the edges of the top nozzle 76. That same gripper of my copending application is employed herein to grip and lift one of the fuel assemblies. The only change made is to modify slightly the internal square actuating tube to accommodate a guide for the sampling tube.

Figure 6:
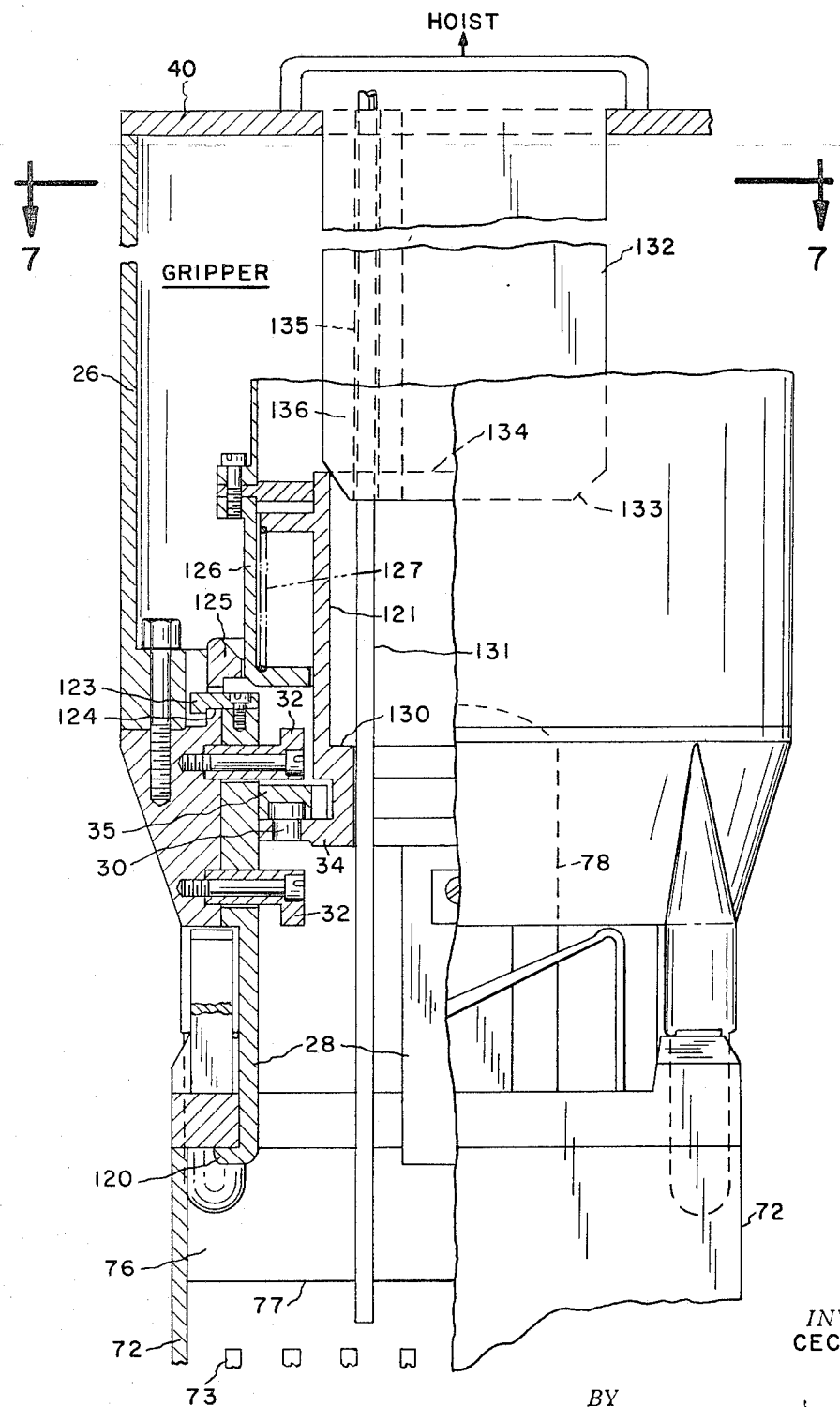
FIG. 6 is a partly cross-sectional, partly elevational view of the gripper employed in apparatus of FIG. 2.

FIG. 6 illustrates such a gripper apparatus including the actuating cam system and safety lock used in a lifting operation. The same reference numerals are used as in FIG. 1 for similar parts. It comprises a gripper tube 26, gripper fingers 28 with modified extensions 120 laterally slidable on guide pins 32. An inner square tube 121 contains the lateral cam segments 34 with cam pins 30 activating cam followers 35 secured to the fingers 28. The lock mechanism used in a lifting operation includes a locking finger 123 for engaging a rim 124 on the gripper tube and extending through a hole in a guide member 125 for an actuator tube 126 which supports the square tube 121 by an annular compression spring 127. In this embodiment, as shown in FIG. 7, the actuating air cylinder 36 is connected between the actuator tube 126 and the gripper tube 26. Rotation of the actuator tube 126 causes corresponding rotation of the square tube 121. The gripper structure mainly differs from the gripper of my copending application only in that a corner of the inwardly extending horizontal shelf 130 of the square tube 121 bottom, which is designed to receive the top of the control rod assembly, has been cut away to accommodate passage of the sampling tube 131. The sampling tube 131 is aligned relative to the final assembly by means of an elongated hollow square tube 132 which extends downward from and is supported by the upper support plate 40 of the gripper and whose bottom is bevelled 133 to seat within the top 134 of the square tube 121. A bore 135 extends vertically through a solid corner 136 of the tube guide 132. Through the bore extends the sampling tube 131. The bore 135 is oriented over an unoccupied opening in the bottom grid 77 of the top nozzle 76, and the sampling tube 131 can thus extend down through the gripper, through the grid 77 at the bottom of the top nozzle and terminate in the space below but above the upper grid assembly 75.

The gripper (FIG. 2) is located for vertical movement within an isolation container 90 comprising spaced concentric tubes 91, 92. The inner tube 91 directly surrounds the gripper and its hoist and can accommodate a lifted fuel assembly. The outer tube 92 is spaced from the inner tube. Both tubes extend from the reactor well surface, above the water level W, all the way down almost to the core surface. The system is supported by an overhead hoist (not shown). The outer tube 92 is connected to or fixed to the hoist, and the inner tube 91 is vertically movable relative to the outer tube. Vertical movement is obtained by a suitable air cylinder 93 mounted between the concentric tubes, with the cylinder 94 connected to the inner tube 91 and the piston 95 connected to the outer tube 92. Suitable guides 96 are mounted on the outer tube to guide movement of the inner tube.

Also located between the tubes at the lower side are vertical heating elements 98. Four rod-like heating elements 98 are shown. The tube bottom is fitted with a trap door 100 which can be selectively opened and closed to seal off in a substantially water-tight manner the bottom of the inner tube 91. Any form of suitable remotely activated trap door can be employed. A preferred form employs actuation by movement of the inner tube 91. In the embodiment illustrated, the trap door comprises four circle quadrants or 90° sectors 101 each terminating in an upward extending conical section 102 each of which is hinged 103 at its upper edge to the bottom edge of the outer tube 92. At the junction of each circle sector 101 and conical section 102 is hinged a rod 105, whose upper end is hinged 106 as shown to the inner tube 91, above its bottom. FIG. 2 shows all the trap door segments in their up position forming a substantially water-tight seal along their abutting edges. When the inner tube 91 is moved downward, the door segments 101, 102 are flipped downward completely opening the inner tube bottom. In the closed position, the door segments also abut with their inner surfaces the bottom edge of the inner tube 91, which may be provided with a soft gasket to assist in sealing to the trap door 100.

In operation, the tube assembly 90 is positioned over the fuel assembly in the reactor core to be tested. The gripper apparatus is lowered through the inner tube past the open trap door 100 into contact with the selected fuel assembly 72 in the core, the actuator tube of the gripper operated to grapple to the fuel assemble 72, and then the gripper and hooked fuel assembly lifted up out of the core 70 and into the inner tube 91. When the entire fuel assembly has passed through the open trap door 100, the gripper hoist is stopped, and then the air cylinder 93 activated to raise the inner tube 91, closing the trap door 100, and isolating the lifted fuel assembly and the enclosed coolant column 108 within the inner tube. In order to raise the fuel assembly temperature, the auxiliary heaters 98 are activated and after a short time the desired high temperature is achieved whereby the emission of isotopes characteristic of a leaking fuel rod is intensified, which isotope residues are emitted into the surrounding water column. Then, or before the heating step if desired, the sampling tube 131 is lowered through the bore 135 in its guide into a position below the top nozzle grid 77, and a suitable water sample sucked up and analyzed as described above. After testing, the heaters 90 are deactivated, the inner tube 91 moved down to open the trap door 100, and the gripper can be lowered to replace the fuel assembly in its identical position formerly occupied within the reactor core.

In this embodiment, the water level is not reduced by introducing an air bubble as was done with the BWR, but instead the required heating is obtained by the provision of auxiliary heaters. The same improvement in testing sensitivity is obtained by the taking of a water sample from the fuel assembly interior, below the top nozzle.

While the sipping method described for the PWR employing a tube through the gripper is preferred, since the confined water circulates freely through the fuel assembly housing other ways of taking a water sample may also be used. For example, a sipping tube can be extended down along the wall of the inner tube 91 to the level of the fuel elements 73. Also several water samples can be taken at different locations within the isolation container 90 to further increase the sensitivity of the test.

While the principles of the invention have now been made clear in illustrative embodiments, it will be obvious to those skilled in the art that many modifications in structure, arrangement, proportions, elements, materials, and components used in the practice of the invention, which are particularly adapted for specific environments and operating requirements, may readily be made therein without departing from those principles. The appended claims are therefore intended to cover and embrace any such modifications, within the limits only of the true spirit of the invention.

What is claimed is:

1. Apparatus for testing at least one fuel assembly of a BWR while surrounded by coolant in the reactor core for the presence of leaking fuel rods, said fuel assembly comprising a channel having an upstanding peripheral edge portion and an upper tie plate for supporting the upper ends of an assembly of fuel rods and also containing openings free of the fuel rods; comprising gripper means comprising an outer member which is substantially air-tight and having a depending lower edge portion dimensioned to mate with and substantially seal to the upstanding peripheral edge portion of the channel forming with the latter a container which is substantially air-tight, means coupled to the outer member for selectively locking to the fuel assembly channel, means for introducing an air bubble into the container for depressing the coolant level causing the temperature of the fuel rods to rise, and means for introducing a sampling tube through the outer member and through the tie plate opening for removing a sample of coolant disposed beneath the upper tie plate.

2. Apparatus as set forth in claim 1 wherein the channel peripheral edge portion comprises a bevelled edge, and the gripper outer member lower edge portion also comprises a bevelled edge.

3. Apparatus as set forth in claim 2 wherein the outer member comprises depending fingers having lateral extensions for engaging recesses in the channel walls, means supporting the fingers for lateral movement relative to the outer member, and means for actuating the fingers selectively to engage and disengage the recesses.

4. Apparatus as set forth in claim 1 wherein the sampling tube introducing means comprises a guide tube extending through the gripper from the outer member wall to the vicinity of the channel and provided with means for sealing to the sampling tube when the latter is passed therethrough.

5. Apparatus as set forth in claim 1 and further comprising means for lowering and raising the gripper relative to the fuel assembly, a sampling tube support, and means for raising and lowering the sampling tube support relative to the gripper.

* * * * *